C. E. BURTON.

Improvement in Grain-Drills.

No. 130,187.

Patented Aug. 6, 1872.

WITNESSES.
E. A. Bates
J A Connolly

INVENTOR.
Chas. E. Burton,
Chipman Hosmer & Co,
Attys.

UNITED STATES PATENT OFFICE.

CHARLES E. BURTON, OF GILLESPIE, ILLINOIS.

IMPROVEMENT IN GRAIN-DRILLS.

Specification forming part of Letters Patent No. 130,187, dated August 6, 1872.

*To all whom it may concern:*

Be it known that I, CHARLES E. BURTON, of Gillespie, in the county of Macoupin and State of Illinois, have invented a new and valuable Improvement in Wheat-Drill and Seed-Planter; and I do hereby declare that the following is a full, clear, and exact description of the construction and operation of the same, reference being had to the annexed drawing making a part of this specification, and to the letters and figures of reference marked thereon.

Figure 1:
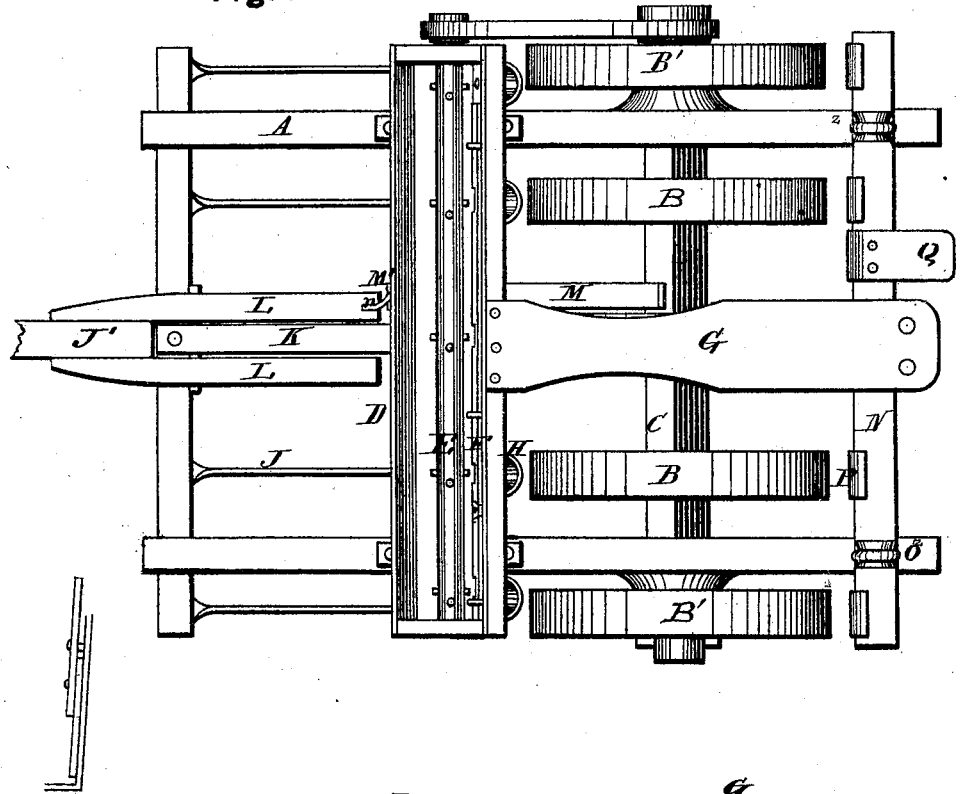
Figure 2:
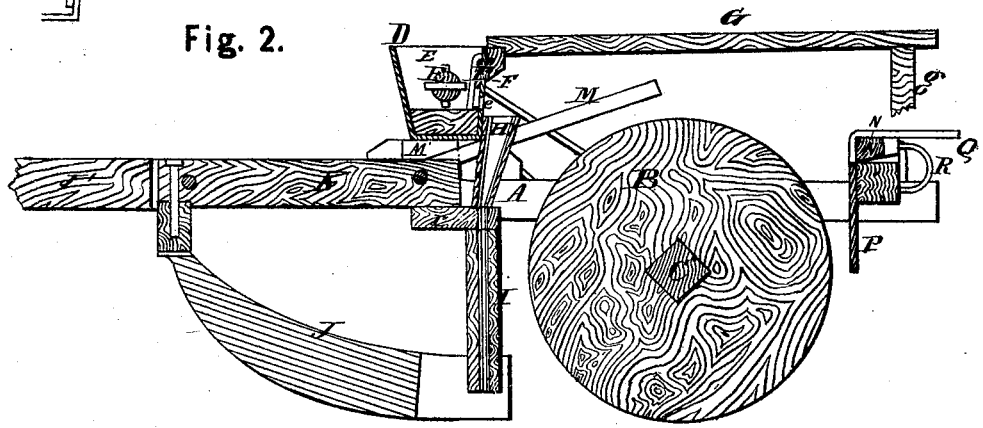

Figure 1 of the drawing is a representation of a top-plan view of my invention. Fig. 2 is a longitudinal section of the same.

This invention has relation to seed-planters; and consists in the construction and novel arrangement of the devices by which the seed is discharged to the rear into the dropping-tubes, in the arrangement of the outer loose wheels in connection with a series of inner driving-wheels fixed on the shaft, and in the construction of the beveled rocking-bar by which the scrapers are operated.

Referring to the accompanying drawing, A represents the main frame of my improved seed-planter, supported in the rear by means of the series of rollers B, which are rigidly attached to the axle C, and by the wheels B' rotating loosely on said axle at each end thereof. D designates the seed-box; E, a studded seed-roller; e, perforations in the back of the box for the seed to escape and be seen by the driver; F, a seed-slide. G is the driver's seat, resting on the seed-box and on a standard, g, attached to the back of the frame. H indicates the seed-spouts leading into the flukes I. I' is a transverse bar supporting the tubes, which correspond in number to the rollers. J designates the runners attached to the front part of the frame A and to the lower ends of the flukes. The rear ends of the runners are bifurcated, so as to constitute end shoes. K represents a bar resting on the front beam of the frame A and the beam I. J' is the draft-pole, having hounds L, which are pivoted to the bar K. M designates a lever, pivoted between the rear end of the bar K and a standard, M', and connected to one of the hounds L by an arm, n. This lever extends back underneath the seed-box and within reach of the driver's foot. By the operation of this lever the forward part of the frame A is raised. The driver's weight, it will be observed, bears on the back part of the frame and renders the raising of the forward part of the frame easier than it would otherwise be. N denotes a transverse bar attached to the rear end of the frame A by means of loops O embracing the half journals Z. This bar is provided with a number of scrapers, P, which depend toward the rollers B. The bar N is beveled on its under side toward the rear. A foot-plate, Q, projects from said bar and rests on a spring, R. By pressing on said plate the scrapers are brought in contact with the rollers. When the pressure is removed the spring R raises the bar and scrapers to their original positions.

What I claim as my invention, and desire to secure by Letters Patent, is—

The combination, with the rear bar of the frame A, of the beveled rocking-bar N, having the scrapers P, treadle-plate Q, spring R, staples O, and half journals Z, substantially as specified.

In testimony that I claim the above I have hereunto subscribed my name in the presence of two witnesses.

CHARLES E. BURTON.

Witnesses:
 ROBT. BROWN,
 B. F. CLARK.